(12) United States Patent
Thellmann

(10) Patent No.: US 8,572,764 B2
(45) Date of Patent: Nov. 5, 2013

(54) EXERCISING GLOVE

(76) Inventor: Dieter Thellmann, Columbus, OH (US)

( * ) Notice: Subject to any disclaimer, the term of this patent is extended or adjusted under 35 U.S.C. 154(b) by 245 days.

(21) Appl. No.: 12/964,275

(22) Filed: Dec. 9, 2010

(65) Prior Publication Data

US 2012/0144554 A1 Jun. 14, 2012

(51) Int. Cl.
*A63B 23/16* (2006.01)
*A61B 5/22* (2006.01)
*A41D 19/00* (2006.01)

(52) U.S. Cl.
USPC ........................................ 2/161.1; 73/379.02

(58) Field of Classification Search
USPC .............. 2/161.1, 161.2, 161.3, 161.4, 161.5; 473/202; 73/379.01, 379.02
See application file for complete search history.

(56) References Cited

U.S. PATENT DOCUMENTS

| | | | |
|---|---|---|---|
| 4,247,097 A | | 1/1981 | Schwartz |
| 5,511,789 A | * | 4/1996 | Nakamura ..................... 473/202 |
| 5,542,126 A | * | 8/1996 | Harvanek ....................... 2/161.2 |
| 5,655,223 A | * | 8/1997 | Cozza ............................ 2/161.2 |
| 5,733,201 A | * | 3/1998 | Caldwell et al. ............... 473/202 |
| 5,771,492 A | * | 6/1998 | Cozza ............................ 2/161.2 |
| 6,016,103 A | * | 1/2000 | Leavitt .......................... 340/575 |
| 6,913,559 B2 | * | 7/2005 | Smith ............................... 482/4 |
| 6,990,689 B1 | | 1/2006 | Thellmann |
| 7,780,541 B2 | * | 8/2010 | Bauer ........................... 473/205 |
| 8,221,291 B1 | * | 7/2012 | Kantarevic .......................... 482/8 |
| 2007/0289379 A1 | * | 12/2007 | You et al. .................... 73/379.03 |
| 2008/0189827 A1 | * | 8/2008 | Bauer ............................ 2/161.2 |

OTHER PUBLICATIONS

Nguyen, Du Tran, "Verva Vie Sports Gauntlet", 2008, http://student.designawards.com.au/application_detail.jsp?status=2&applicationID=3626.
McCloskey; Alan "Peregrine USB PC Game Controller", Sep. 12, 2009, http://www.ocmodshop.com/ocmodshop.aspx?a=1672.

* cited by examiner

*Primary Examiner* — Lisa Caputo
*Assistant Examiner* — Punam Roy
(74) *Attorney, Agent, or Firm* — Cooper Legal Group, LLC

(57) ABSTRACT

One or more gloves are disclosed herein. A glove body comprises a glove body internal surface that defines a palm compartment enveloping at least part of a user's palm, a glove body external surface, and a wrist aperture that provides an opening for the user's hand. Digit appendages comprise a digit appendage internal surface that extends the palm compartment to envelop all/part of the user's digit, and a digit appendage external surface. One or more sensors are attached to the glove body to detect one or more hand exercise events that involve a user hand exercise. A memory component, powered by a battery, stores the hand exercise event, upon receiving a hand exercise event detected by a sensor. A device interface delivers the one or more hand exercise events from the memory to a device, upon connection to the device.

20 Claims, 4 Drawing Sheets

EXERCISING GLOVE

BACKGROUND

In many types of sports, rehabilitation, and physical fitness, an effort exercise or training is used to improve performance, among other things. Such training/exercise generally includes physical conditioning, health monitoring, and/or following a particular exercise regimen, which may also include weight training to improve, among other things, cardio-vascular health and muscular strength.

Following a particular exercise regimen, and performing health monitoring, such as heart monitoring, typically involves using separate components. That is, for example, when following an exercise regimen, the individual follows written instructions, or takes guidance from a personal trainer or physical therapist, who may also use devices to monitor the individual's health. In the absence of such equipment and/or guidance the individual may miss steps in the exercise regimen, and/or use the monitoring devices in an incorrect manner. Additionally, weight training is often performed on free weights and/or weight machines where general muscle areas or groups are trained. Thus, while providing some benefits, weight training may not work particular muscles that are needed for desired rehabilitation/physical fitness training, such as cardio health.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Currently, some gloves associated with physical training and exercise comprise certain health monitoring devices, such as heart monitor, and provide for weight(s) to be integrated with the glove. Further, some gloves associated with video gaming utilize integrated sensors that provide for input to a video game during game play. However, gloves associated with physical fitness exercise, sports training, or physical rehabilitation, for example, do not provide for integrating sensors into a glove where a particular exercise regimen may be detected, such as for improving or evaluating the performance of the user.

Accordingly, as provided herein, in one embodiment of a glove, a glove body comprises a glove body internal surface defining a palm compartment enveloping at least a portion of a palm of a user, a glove body external surface, and a wrist aperture. The glove further comprises digit appendages, comprising a digit appendage internal surface extending the palm compartment to envelop at least a portion of a digit of the user, and a digit appendage external surface. Additionally, the glove comprises at least one sensor that is attached to the glove body and configured to detect at least one hand exercise event involving a hand exercise of the user. A memory component is also attached to the glove body and it is configured to store the hand exercise event, upon receiving a hand exercise event detected by a sensor. A battery comprised in the glove is used to power at least the memory, and a device interface comprised in the glove is configured to, upon connecting to a device, deliver the at least one hand exercise event stored in the memory to the device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
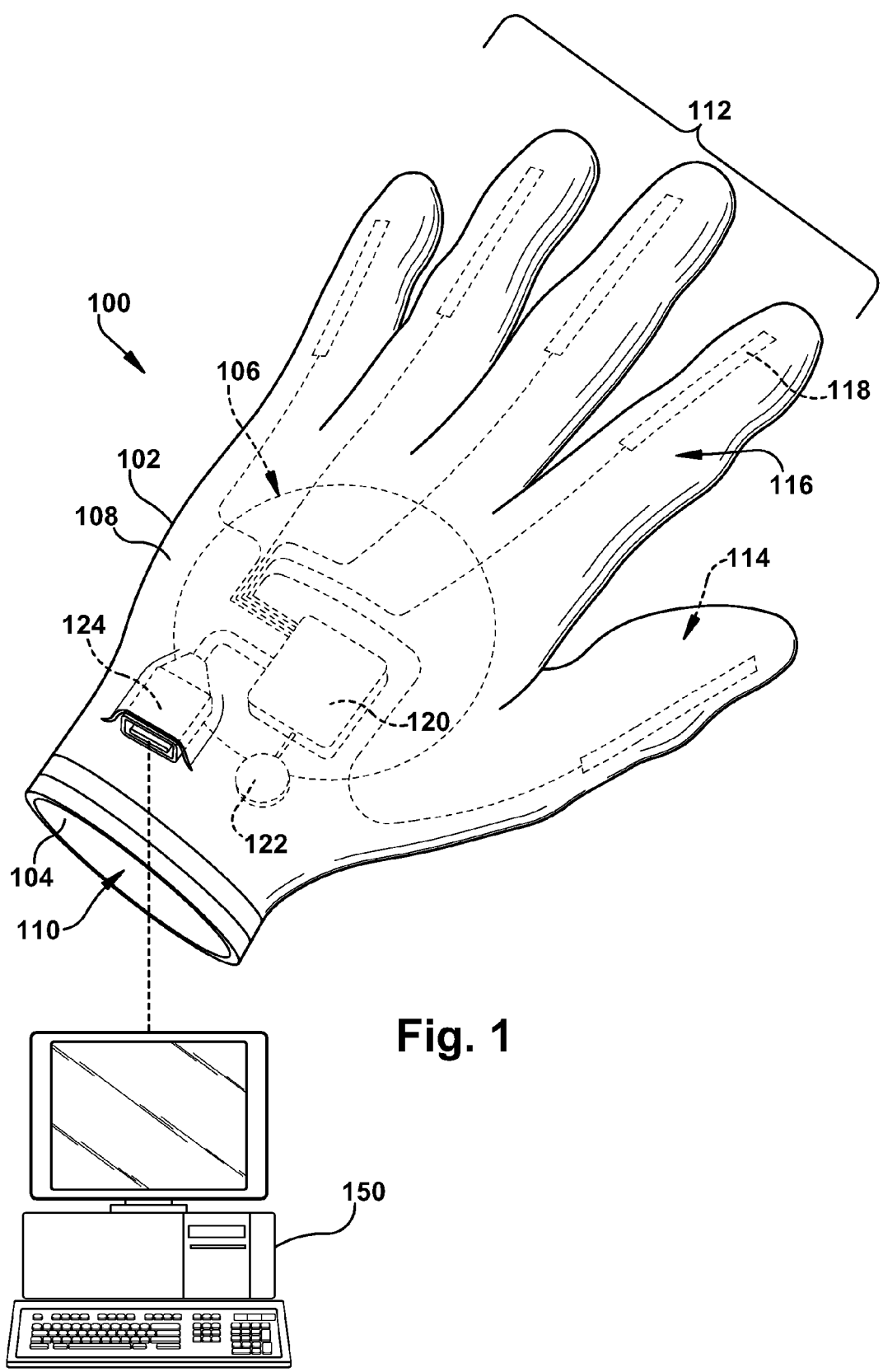
FIG. 1 is an illustration of a glove in accordance with one or more aspects described herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Various structures and/or features are not necessarily drawn to scale. In other instances, structures and features are shown in block diagram form in order to facilitate describing the claimed subject matter.

As provided herein, a glove may be devised that can provide for improved fitness, training and/or exercising, where elements of the training/exercising can be detected by sensors and electronically stored locally in the glove, such as for later use by the wearer (or a third party). The glove can comprise a memory component for locally storing training/exercising events, and an interface used to communicate information stored locally in the glove to a remote computing device, for example, such as by connecting to the interface.

Further, weights may be selectively added to and/or removed from the glove during training/exercising for a desired biomechanical enhancement for a workout activity (e.g., running, cardio-training, sports training). For example, weights can be located on a back portion of the glove to facilitate resistive training to strengthen desired body parts (e.g., shoulders, forearms, wrists, upper arms), as well as improvements in cardio-vascular health.

As an illustrative example, using (a pair of) the gloves with the selectively removable weights may provide benefits to individual users with particular conditions. For example, arthritic users who wear the gloves may experience a benefit from heat provided by wearing the gloves, as well as the biomechanical training, and cardiovascular training, such as by improving blood flow to arthritic regions. Further, as an example, users that may have Parkinson's disease may derive a benefit from wearing the gloves with the weights optionally attached, where the weights applied to the hands of the user may mitigate perceived tremors, and may slow down progression of the disease. Additionally, users that have an autistic condition may experience a benefit when attempting fine motor skill based tasks, such as writing. As an example, pressure applied by the weights attached to the gloves may provide enhanced training for improvement of these fine motor skills.

Additionally, one or more monitors, sensors, and/or electronic aids can be comprised in or on the glove. For example, a heart monitor, oxygen sensor, contact sensors, motion sensors, temperature sensors, may be integrated with the glove. In this example, information from the sensors can be stored in local memory, and/or used for input to other sensors, monitors and/or electronic aids. As another example, sensory outputs, timing devices, and/or other user interaction aids can be integrated with the glove, and used to provide the user with desired information, and/or used for input to other sensors, monitors and/or electronic aids.

With reference to the attached figures, as illustrated in FIG. 1, the glove 100 comprises a glove body 102, which comprises a glove body internal surface 104 that defines a palm compartment 106 enveloping at least a portion of a palm of the user/wearer. The glove body 102 further comprises a glove body external surface 108 and a wrist aperture 110, such as for inserting the user's hand. Digit appendages 112 (e.g., four (or fewer) fingers and/or a thumb) comprise a digit appendage internal surface 114 that extends the palm compartment 106 to envelop at least a portion of a digit of the user. The five digit appendages 112 further comprise a digit appendage external surface 116.

It will be appreciated, however, that the glove can contain any suitable number of digit appendages (e.g., 112) depending upon the needs and preferences of the wearer/user. Additionally, the digit appendages may also be designed so as to not completely encase one or more of the wearer/user's fingers. In one embodiment, as illustrated in the example embodiment of a glove 200 of FIG. 2, at least one digit appendage can comprise a digit aperture 202 configured to expose a distal portion of the digit of the user/wearer. For example, the wearer may desire to have at least a portion of one or more of their digits at least partially exposed to enhance tactile sensitivity and/or keep their hands cool, among other things.

Figure 2:
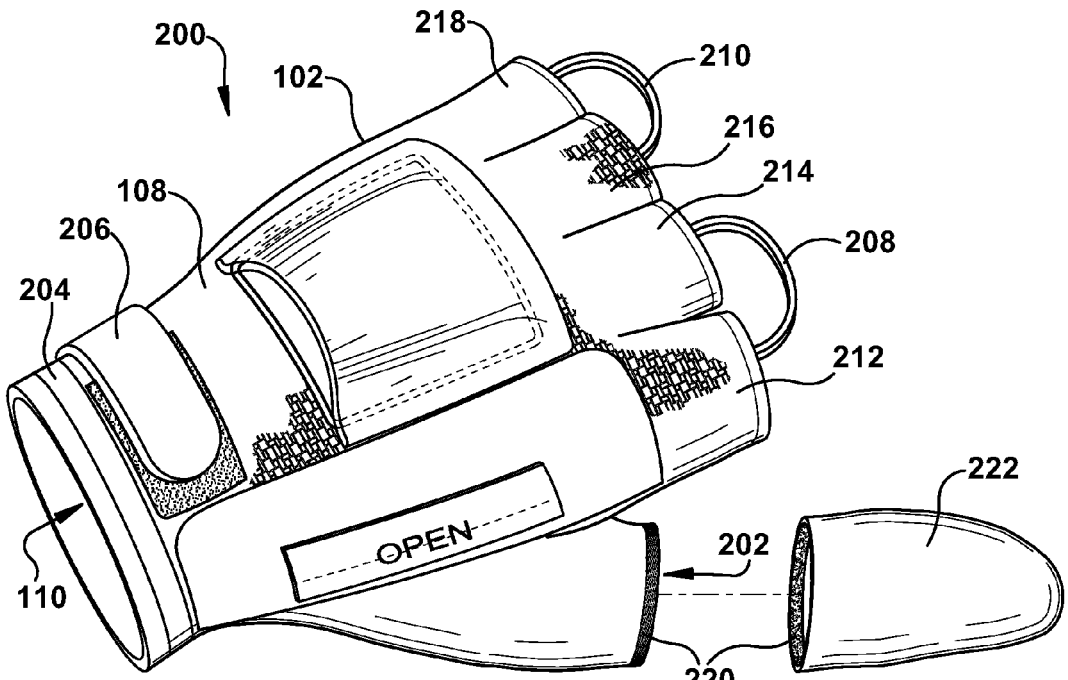
FIG. 2 is an illustration of a glove in accordance with one or more aspects described herein.

Further, as shown in FIG. 2, it is contemplated that one or more of the digit appendages 222 may also be selectively detachable and re-attachable as may suit wishes of the user. The digit appendages 222 may, for example, be attached with any suitable type(s) of fastening means 220, such as buttons, snaps, zippers, tape and/or a hook and latch-loop type system, for example. In a hook and latch system, a plurality of hooks engage a plurality of loops when the two are brought together (e.g., VELCRO).

As an example, the glove 100 can be formed out of one or more suitable materials, such as latex, neoprene, vinyl, nylon, one or more elastomers, woven fabrics, real and/or artificial leathers, etc. The materials can overlay one another and/or be arranged in any suitable manner (e.g., stitched together) to achieve a desired configuration, interrelation and/or cooperation. By way of example, one or more portions of the assembled materials can have a desired thickness while one or more other portions may have a different desired thickness. For example, similar or varying thicknesses can yield a desired balance of weight, flexibility, elasticity, stiffness, resiliency, durability and/or breath-ability for the user/wearer, depending on a type of activity, level of comfortability, and/or desired durability.

In one embodiment, at least a portion of at least one digit appendage external surface 116 can be comprised of a porous fabric. For example, a portion or the entire digit appendage external surface 116 that entirely encloses a user's digit can be comprised of the porous fabric. Further, as an example, a portion or the entire digit appendage external surface 116 that merely encloses a portion of the user's digit (e.g., as illustrated in FIG. 2) can be comprised of the porous fabric.

In one embodiment, as illustrated in FIG. 2, the glove body 102 can comprise an elastic wristband 204 encircling at least a portion of the wrist aperture 110 and configured to secure the wrist aperture 110 to a wrist of the user. In one embodiment, the glove body 102 can comprise an expandable wrist adjustment 206 attached to the glove body external surface 108, near the wrist aperture 110. The wrist adjustment 206 can be used to expand the glove body external surface 108 to accommodate a wrist of the user.

In the example embodiment 200, the glove can comprise one or more pull loops, such as a first pull loop 208 attached to a first digit appendage 212, used for an index digit of the user, and a second digit appendage 214, used for a middle digit of the user. Further, in this embodiment, the glove can comprise a second pull loop 210 attached to a third digit appendage 216, used for a ring digit of the user, and a fourth digit appendage 218, used for a little digit of the user. As an example, the first and second pull loops 208, 210 can be used to facilitate removal of the glove 200 from the wearer/user's hand, such as by grasping the pull loops 208, 210 using the wearer's other hand and pulling toward the tips of the wearer's digits (e.g., away from the wrist).

The glove 100, can further comprises at least one sensor 118 attached to the glove body 102 that detects at least one hand exercise event involving a hand exercise of the user. A memory component 120 can be attached to the glove body 102 to, upon receiving a hand exercise event detected by a sensor 118, store the hand exercise event. A battery 122 can power at least the memory component 120; and a device interface 124 can, upon connecting to a device 150 (e.g., computing device), deliver the at least one hand exercise event stored in the memory 120 to the device 150.

For example, the user of the glove 100 may perform hand (or other) exercises (or training) while wearing the glove 100. During the exercising, the sensor(s) 118 can detect a hand exercise event, such as a particular manipulation of a specific digit (e.g., squeezing the middle finger inward to the palm). In this example, the hand exercise event may be one of a plurality of hand exercise events performed by the wearer (e.g., for training or rehabilitation), where the respective events can be stored locally in the memory 120. Further, in this example, at a desired time, the user can use the interface 124 to interface with a computing device (e.g., computer, portable smart device, proprietary training device) to upload the hand exercise events to the computing device. In this way, for example, the user may log exercises, such as for evaluating training improvement.

Figure 3:
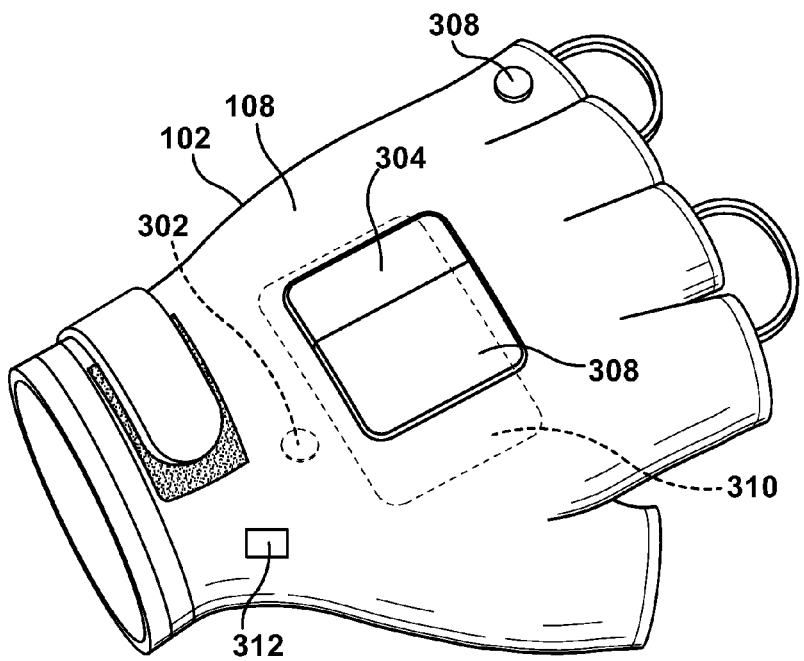
FIG. 3 is an illustration of a glove in accordance with one or more aspects described herein.

In one embodiment 300, as illustrated in FIG. 3, the at least one senor 118 can comprise a pressure sensor 302 that detects one or more pressure events at a location on the glove body external surface 108. In one embodiment, the at least one senor 118 can comprise a glove motion sensor 304 that detects a motion event of the glove 300. In one embodiment, the at least one senor 118 can comprise a digit motion sensor (e.g., 118 of FIG. 1) that detects a motion event of one or more digits of the user. In one embodiment, the at least one senor 118 can comprise a temperature sensor 308 that detects a temperature at a location of the glove body external surface 108. In one embodiment, the at least one senor 118 can comprise a contact sensor 310 that detects a contact event of the glove 300 with a contact object.

It will be appreciated that one or more of the respective sensors described above (e.g., and others not described) may be utilized together, and/or in conjunction or combination with other sensors. For example, the glove 100 can comprise a contact sensor 310 in the respective digit appendages 112, such as integrated on/in the digit appendage external surface 116, in order to detect surface contact. Further, the glove may also comprise pressure sensors distributed at appropriate pressure point in/on the glove, such as to detect when pressure is applied to these points of the glove (e.g., when squeezing the hand). Additionally, the glove can comprise a glove motion sensor 304 in the glove body 102, and digit motion sensors in the respective digit appendages in order to detect motion, such as when performing desired exercise/training routines.

It will be appreciated that the glove 100 is not limited to the sensors described above. For example, a heart monitor may be integrated with the glove body 102, such as at the wrist aperture 110 area, where a heart beat may be detected, monitored, and used for training, exercise, and or health related purposes. Further, as another example 400 of FIG. 4, a blood oxygen level sensor 420 may be integrated with the glove body 102, such as at the digit appendage internal surface 114, where the oxygen level sensor can monitor blood oxygen levels for training, exercise, and or health related purposes. In one embodiment, the various sensors can be operably coupled with (e.g., by wire or wirelessly) the memory component 122 for storing the sensor information. It is anticipated that those skilled in the art may devise alternate sensors to integrate with the glove 100. For example, a pulse/EKG monitor 418 may be used to monitor the wearer's heart health during exercise/training.

In one embodiment, the memory component 120 can be configured to store a hand exercise regimen that comprises at least one prescribed hand exercise event to be performed by the user. In this embodiment, at least one of the hand exercise events detected by the sensor(s) can correspond to the prescribed hand exercise event. Further, upon receiving the hand exercise event (e.g., detected by the sensor(s)), the memory 120 can attempt to match the hand exercise event with a corresponding prescribed hand exercise event that has been stored in the memory, and store the hand exercise event that is matched with the corresponding prescribed hand exercise event. For example, fine motor skills, and improvement or degradation, thereof of a patient with a neuromuscular (or other) affliction may be tracked and/or evaluated for example.

In this way, for example, a training or rehabilitation regimen can be loaded to the memory 120 (e.g., using the interface 124), and the user can perform the prescribed regimen, where the user's attempted performance can be recorded into memory. Further, in this example, the user performance can later be uploaded to a computing device for evaluation. In one embodiment, the hand exercise regimen can be a physical therapy hand exercise regimen, such as to provide healing and rehabilitation after an injury/disease. In one embodiment, the hand exercise regimen can be a physical training hand exercise regimen, such as used to train the user's hand to perform particular tasks (e.g., guitar playing), or physical performance hand exercise regimen, such as to strengthen the user's hand for a particular activity (e.g., pitching). In this manner, not only can a (quantitative) determination be made as to whether a patient is performing a prescribed (treatment, rehabilitative, training etc.) regimen, but also how well the patient is (qualitatively) performing (e.g., where at least some of the above and/or at least some of the following description may be implemented to facilitate such determination(s)).

In one embodiment, the glove 300 can comprise a gesture identifying component 312 that identifies a hand gesture detected by one or more of the sensors 118. For example, the gesture identifying component can receive inputs from one or more of the sensors, such as pressure 302, and glove and digit motion 304, 306, and combine them to identify a particular hand gesture (e.g., a punching motion, with hand clenched and moving forward). Upon receiving a hand gesture identified by the gesture identifying component 312, the memory component 120 can store the hand gesture locally in the memory. Further, in this embodiment, upon connecting to the device 150, the device interface 124 can deliver the at least one hand gesture stored in the memory to the device.

It will be appreciated that the device interface 124 can comprise any means for communicating information (e.g., data) between the memory 120 locally and the device (e.g., remote computing device). In one embodiment, the device interface can comprise a wired interface connection, such as a serial communication interface, parallel communication interface, network adapter interface, universal serial bus (USB) interface, Firewire interface, or some other means for connecting a type of wire (e.g., metal, polymer, fiber optics, or combination thereof) between the device interface 124 and the computing device 150. In another embodiment, the device interface can comprise a wireless interface connection, such as an infrared communications interface, Bluetooth communications interface, wifi interface, wimax interface, cellular interface, or some other means for wirelessly communicating between the device interface 124 and the computing device 150.

Additionally, in one embodiment, the device interface 124 may be selectively removed from or placed into/onto the glove body 102. For example, the device interface 124 may be operably coupled with the memory component 120, and together they can be removed from the glove 100 to upload data from the memory to the device 150. In one embodiment, an integrated device interface 124/memory component 120 may be uncoupled (e.g., unplugged) from a sort of connector that connects sensors, and/or other components, to the memory, then recoupled (e.g., plugged in) as desired.

In one aspect, other training/exercising aids may be integrated with the glove 100. In one embodiment, the glove 400 can comprise a clock 402 that is attached to the glove body 102 and can be powered by the battery 122, or otherwise powered. In this embodiment, the memory can be configured to store an event time indicated as by the clock in association with a hand exercise event, when the hand exercise event was detected by one or more of the sensors (e.g., and/or the gesture identification component 312).

Figure 4:
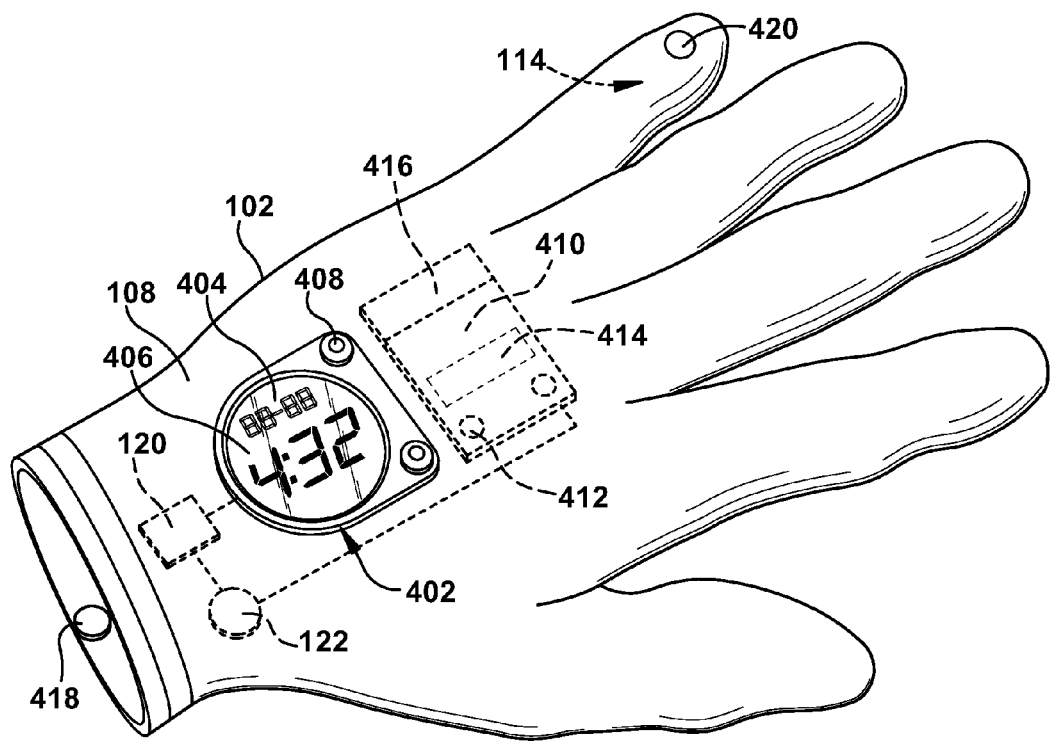
FIG. 4 is an illustration of a glove in accordance with one or more aspects described herein.

In another embodiment, as illustrated in FIG. 4, the glove body 102 can comprise a stopwatch 404 that is attached to the glove body external surface 108. In this embodiment, the stopwatch 404 can comprise a stopwatch output component 406, such as a digital display, and/or connection to the memory, and a stopwatch control set 408, such as a set of buttons or one or more touch sensitive surfaces. In this embodiment, the stopwatch 404 can be powered by the battery 122. In this way, the user may time desired training/exercise events for visual feedback, and/or for storage in memory in conjunction with the exercise events.

In another embodiment, the glove body 102 can comprise a cadence generating component 410, which can be used by the wearer to facilitate keeping a desired cadence or pace, such as when running or performing other exercises. The cadence generating component 410 can comprise a cadence control set 412 that receives a desired cadence input from the user, such as from buttons or touch sensors. The cadence generating component 410 can further comprise a cadence measuring component 414 that measures a desired cadence of the user, such as by an accelerometer, pedometer, or other motion sensor. The cadence generating component 410 can also comprise a cadence output component 416 that signals the desired cadence to the user, such as by providing a detectable vibration, light signal, or audio signal. In this embodiment, the battery 122 can be used to provide power for the cadence generating component 410.

Figure 5:
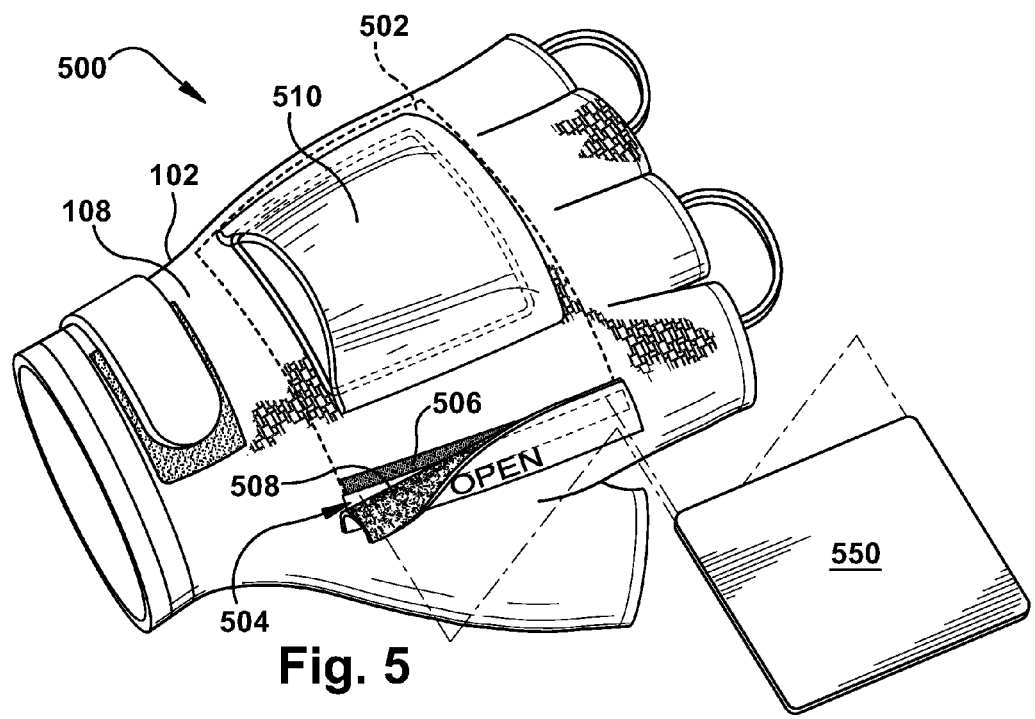
FIG. 5 is an illustration of a glove in accordance with one or more aspects described herein.

In one aspect, the glove 100 can comprise a means for selectively accommodating one or more weights, such as attached to the glove body 102. In one embodiment 500, as illustrated in FIG. 5, the glove body 102 can comprise a weight pouch 502 that is attached to the glove body 102 to receive one or more weights 550, where the weight pouch 502 comprises a sealable weight pouch aperture 504. In one embodiment, the weight pouch 502 can be attached to a dorsal region (e.g., back or the hand of the glove) of the glove body external surface 108 of the glove body 102.

In this aspect, the weight(s) 550 can be selectively added to and removed from the glove as desired for, among other things, training and strengthening purposes. The weight pouch 502 can comprise a pocket or flap to facilitate selective accommodation of the weight(s) 550. In one embodiment, the shape and/or size of the weight pouch 502 is generally similar to the dimensional characteristics of the weight(s) 550. As an example, the weight(s) 550 can comprise a generally rectangular, flexible member (e.g., packet of weight beads) that can rest against the back of the hand, and the weight pouch 502 is generally square or rectangular to accommodate the weight(s) 550.

In one embodiment, the weight(s) 550 are associated within the weight pouch 502 in a substantially fixed relationship so as to not move around, for when the wearer may make quick or sudden movements. This can mitigate the weight(s) 550 becoming a nuisance and potentially impacting or bouncing against the back of the wearer's hand during use.

In one embodiment, the sealable weight pouch aperture 504 can comprise a hook strip 506 (e.g., Velcro hook strip) attached to a first portion of the sealable weight pouch aperture, and a fabric hook receiving strip 508 (e.g., Velcro fabric strip) attached to a second portion of the sealable weight pouch aperture 504, where the second portion opposing the first portion. In this embodiment, when the hook strip 506 and fabric hook receiving strip 508 are conjoined, they substantially seal the weight pouch 502, such that the weight 550 is mitigated from being dislodged from the weight pouch 502.

It will be appreciated that the means for securing the weight(s) 550 to the glove body 102 are not limited to the embodiments described above. For example, the weight pouch 502 may be outfitted with closing means to seal the weight(s) 550 therein, such as snaps, a zipper or any suitable type of closing means (e.g., buttons, tape, etc.). Similarly, any suitable type of securing means can be utilized to hold the weight(s) 550 in place, such as buttons, tape, Velcro, snaps, etc.

It will be appreciated that the weight(s) 550 can be formed out of any suitable material and have any desired shape. The weight(s) 550 can, for example, be formed out of steel, which is resistant to breaking down or rusting, and can keep a desired shape. Similarly, the weight(s) 550 can be made out of iron, copper, lead, silicon, ceramics, magnetic materials, etc. Such materials may also hold their shape and can be fashioned into any desirable shape with relative ease. For example, the weight(s) 550 can be formed into a substantially round or oval shape that lacks sharp edges, or a shape that mimics the contours of the back of the hand. The weights can likewise comprise particles (e.g., beads) of any one or more of such materials (e.g., that may more evenly distribute). Additionally, the weight(s) 550 can be formed out of magnetic materials may provide therapeutic effects.

In this aspect, in one embodiment, the location of the weight(s) 550 within the glove 500 is chosen for desired biomechanical advantage. More particularly, the weight(s) 550 can be located on a back portion of the hand to facilitate resistive training to strengthen desired body parts (e.g., shoulders, forearms, wrists, upper arms), and/or for cardio-vascular training. The location of the weights can thus enhance responsiveness, dexterity and hand eye coordination, while improving stamina of the muscles controlling movement of the hand, and cardio-vascular health, such as during rehabilitative exercise.

Figure 6:
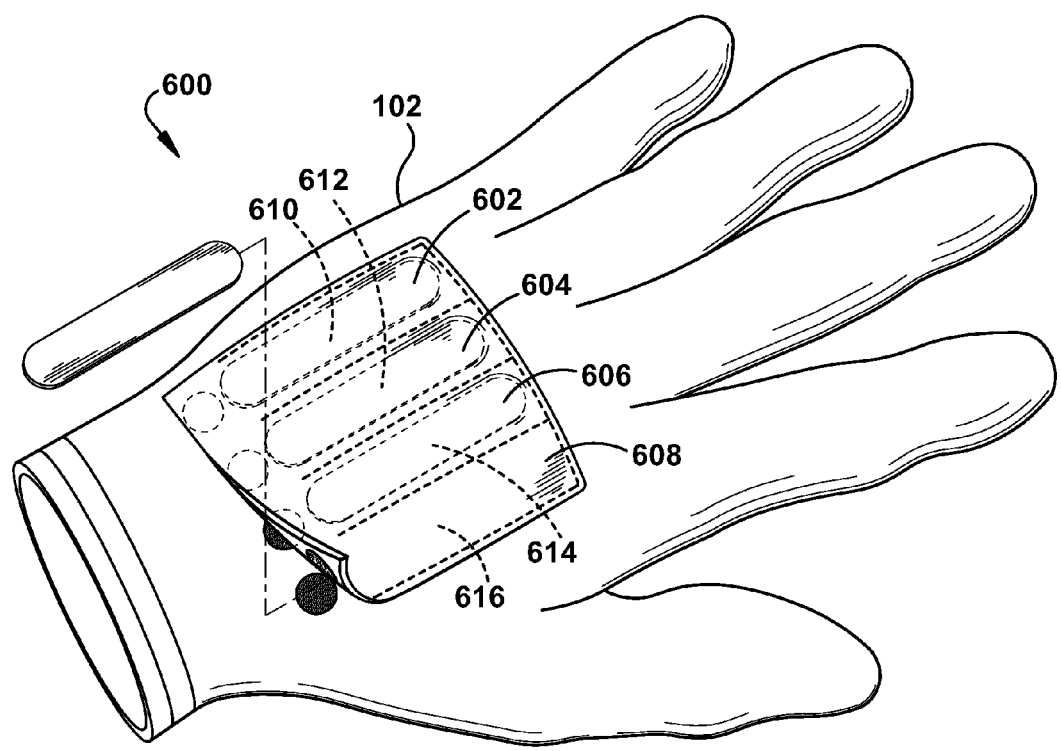
FIG. 6 is an illustration of a glove in accordance with one or more aspects described herein.

In one embodiment, a plurality of weights having a same or different magnitude can be selectively associated with the glove body 102 to provide a desired training weight. As illustrated in FIG. 6, four substantially rectangular shaped weights 602, 604, 606, 608 are situated within respective weight pouches 610, 612, 614, 616 so as to be substantially parallel to metacarpal bones in the back of the hand. Such weight pouches 610, 612, 614, 616 can snugly receive the weights 602, 604, 606, 608 and/or the weights 602, 604, 606, 608 can be selectively secured therein via securing means (e.g., Velcro, buttons, snaps, etc.). Such weights may similarly be selectively added to one larger pocket that can be opened and closed. It will be appreciated that the weights can be arranged in any suitable manner, configuration, and/or combination of magnitudes.

In one embodiment, the glove body 102 can comprise one or more reflectors that are attached to the glove body external surface, such as to provide for visibility of the glove 600 during night exercising (e.g., running at night). Further, in one embodiment 500 of FIG. 5, the glove body 102 can comprise a glove pocket 510 that is attached to the glove body external surface, such as for use by the wearer to store items (e.g., keys, ID, money). In one embodiment, the pocket 510 may comprise a closing means, for example, that provides for securing an opening of the pocket. The closing means are not limited to any particular embodiment, and may comprise a zipper, a hook-loop fastener, buttons, or snaps.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A glove, comprising:
   a glove body comprising:
      a glove body internal surface defining a palm compartment enveloping at least a portion of a palm of a user;
      a glove body external surface; and
      a wrist aperture;
   one or more digit appendages comprising:
      a digit appendage internal surface extending the palm compartment to envelop at least a portion of a digit of the user; and
      a digit appendage external surface;
   at least one sensor attached to the glove body and configured to detect at least one hand exercise event involving a hand exercise of the user;
   a memory attached to the glove body and configured to, upon receiving an indication of a hand exercise event detected by a sensor, store data corresponding to the hand exercise event;
   a battery powering at least the memory; and
   a device interface configured to, upon connecting to a device, provide at least some of the stored data corresponding to the hand exercise event to the device,
   the memory configured to store a hand exercise regimen comprising at least one prescribed hand exercise event to be performed by the user; and
   the memory configured to, upon receiving from a second sensor an indication of a performance of a second hand exercise event by the user:
      match the second hand exercise event with a corresponding prescribed hand exercise event; and
      store data corresponding to the second hand exercise event associated with the corresponding prescribed hand exercise event.

2. The glove of claim 1, at least one sensor selected from a sensor set comprising:
   a pressure sensor configured to detect at least one pressure event at a glove body external surface location;
   a glove motion sensor configured to detect at least one motion event of the glove;
   a digit motion sensor configured to detect at least one motion event of at least one digit of the user;
   a temperature sensor configured to detect a temperature at a glove body external surface location; and
   a contact sensor configured to detect a contact event of the glove with a contact object.

3. The glove of claim 1, the sensor at least one of the same as the second sensor or different than the second sensor, the hand exercise event at least one of the same as the second hand exercise event or different than the second hand exercise event.

4. The glove of claim 1, the hand exercise regimen selected from a hand exercise regimen set comprising at least one of:
   a physical therapy hand exercise regimen;
   a physical training hand exercise regimen; or
   a physical performance hand exercise regimen.

5. The glove of claim 1,
   the glove comprising a gesture identifying component configured to identify at least one hand gesture detected by at least one sensor;
   the memory configured to, upon receiving an indication of a hand gesture identified by the gesture identifying component, store data corresponding to the hand gesture in the memory; and
   the device interface configured to, upon connecting to the device, provide at least some of the stored data corresponding to the hand gesture to the device.

6. The glove of claim 1,
   the glove comprising a clock attached to the glove body and powered by the battery; and
   the memory configured to, upon receiving an indication of a second hand exercise event detected by a second sensor, store with data corresponding to the second hand exercise event an event time indicated by the clock.

7. The glove of claim 1, the device interface selected from a device interface set comprising:
   a serial communication interface;
   a parallel communication interface;
   an infrared communication interface;
   a network adapter interface;
   a universal serial bus interface; and
   a wireless communication interface.

8. The glove of claim 1, at least one digit appendage comprising a digit aperture configured to expose a distal portion of the digit of the user.

9. The glove of claim 1, at least a portion of at least one digit appendage external surface comprising a porous fabric.

10. The glove of claim 1, the glove body comprising an elastic wristband encircling at least a portion of the wrist aperture and configured to secure the wrist aperture to a wrist of the user.

11. The glove of claim 1, the glove body comprising an expandable wrist adjustment attached to the glove body external surface near the wrist aperture and configured to expand the glove body external surface to accommodate a wrist of the user.

12. The glove of claim 1, the glove body comprising a weight pouch attached to the glove body and configured to receive a weight, and comprising a sealable weight pouch aperture.

13. The glove of claim 12, the weight pouch attached to a dorsal region of the glove body external surface of the glove body.

14. The glove of claim 12, the sealable weight pouch aperture comprising:
   a hook strip attached to a first portion of the sealable weight pouch aperture; and
   a fabric hook receiving strip attached to a second portion of the sealable weight pouch aperture, the second portion opposing the first portion and, when conjoining the hook strip, substantially sealing the weight pouch.

15. The glove of claim 1, the glove body comprising at least one of:
   at least one reflector attached to the glove body external surface; or
   a glove pocket attached to the glove body external surface.

16. The glove of claim 1,
   the glove body comprising a stopwatch attached to the glove body external surface and comprising:
      a stopwatch output component;
      a stopwatch control set; and
   the battery configured to power the stopwatch.

17. The glove of claim 1,
   the glove body comprising a cadence generating component comprising at least one of:
      a cadence control set configured to receive from the user an indication of a desired cadence;
      a cadence measuring component configured to measure a second desired cadence of the user; or
      a cadence output component configured to signal at least one of the desired cadence or the second desired cadence to the user.

18. The glove of claim 1, comprising at least one of:
  a first pull loop attached to a first digit appendage for an index digit of the user and a second digit appendage for a middle digit of the user; or
  a second pull loop attached to a third digit appendage for a ring digit of the user and a fourth digit appendage for a little digit of the user.

19. A glove, comprising:
  a glove body comprising:
    a glove body internal surface defining a palm compartment enveloping at least a portion of a palm of a user;
    a glove body external surface;
    at least one reflector attached to the glove body external surface;
    a glove pocket attached to the glove body external surface;
    a wrist aperture;
    an expandable wrist adjustment attached to the glove body external surface near the wrist aperture and configured to expand the glove body external surface to accommodate a wrist of the user;
    an elastic wristband encircling at least a portion of the wrist aperture and configured to secure the wrist aperture to the wrist of the user; and
    a weight pouch attached to a dorsal region of the glove body external surface of the glove body and configured to receive a weight, and comprising a sealable weight pouch aperture comprising:
      a velcro hook strip attached to a first portion of the sealable weight pouch aperture; and
      a velcro strip attached to a second portion of the sealable weight pouch aperture, the second portion opposing the first portion and, when conjoining the velcro hook strip, substantially sealing the weight pouch;
  five digit appendages comprising:
    a digit appendage internal surface extending the palm compartment to envelop at least a portion of a digit of the user;
    a digit appendage external surface comprising a porous fabric; and
    a digit aperture configured to expose a distal portion of the digit of the user;
  a first pull loop attached to a first digit appendage for an index digit of the user and a second digit appendage for a middle digit of the user;
  a second pull loop attached to a third digit appendage for a ring digit of the user and a fourth digit appendage for a little digit of the user;
  at least one sensor attached to the glove body and configured to detect at least one hand exercise event involving a hand exercise of the user and corresponding to a prescribed hand exercise event of a hand exercise regimen, the at least one sensor selected from a sensor set comprising:
    a pressure sensor configured to detect at least one pressure event at a glove body external surface location;
    a glove motion sensor configured to detect at least one motion event of the glove;
    a digit motion sensor configured to detect at least one motion event of at least one digit of the user;
    a temperature sensor configured to detect a temperature at a glove body external surface location; and
    a contact sensor configured to detect a contact event of the glove with a contact object;
  a gesture identifying component configured to identify at least one hand gesture detected by at least one sensor;
  a clock attached to the glove body;
  a stopwatch attached to the glove body external surface and comprising:
    a stopwatch output component, and
    a stopwatch control set;
  a cadence generating component comprising:
    a cadence control set configured to receive from the user an indication of a desired cadence;
    a cadence measuring component configured to measure a second desired cadence of the user; and
    a cadence output component configured to signal at least one of the desired cadence or the second desired cadence to the user; and
  a memory attached to the glove body and configured to:
    store the hand exercise regimen comprising at least one prescribed hand exercise event to be performed by the user; and
    upon receiving an indication of a hand exercise event detected by a sensor:
      match the hand exercise event with a corresponding prescribed hand exercise event, and
      store data corresponding to the hand exercise event associated with the corresponding prescribed hand exercise event with an event time indicated by the clock; and
    upon receiving an indication of a hand gesture identified by the gesture identifying component, store data corresponding to the hand gesture;
  a battery powering at least some of at least one of the memory, the clock, the stopwatch, or the cadence generating component; and
  a device interface configured to, upon connecting to a device:
    provide stored data corresponding to at least one hand exercise event to the device, and
    provide stored data corresponding to at least one hand gesture to the device.

20. A glove, comprising:
  a glove body comprising:
    a glove body internal surface defining a palm compartment enveloping at least a portion of a palm of a user;
    a glove body external surface; and
    a wrist aperture;
  one or more digit appendages comprising:
    a digit appendage internal surface extending the palm compartment to envelop at least a portion of a digit of the user; and
    a digit appendage external surface;
  at least one sensor attached to the glove body and configured to detect at least one hand exercise event involving a hand exercise of the user;
  a memory attached to the glove body and configured to, upon receiving an indication of a hand exercise event detected by a sensor, store data corresponding to the hand exercise event;
  a battery powering at least the memory; and
  a device interface configured to, upon connecting to a device, provide at least some of the stored data corresponding to the hand exercise event to the device,
  at least one of:
    the memory configured to, upon receiving from a second sensor an indication of a performance of a second hand exercise event by the user:
      match the second hand exercise event with a corresponding prescribed hand exercise event; and store data corresponding to the second hand exercise event associated with the corresponding prescribed hand exercise event;

the glove comprising a clock attached to the glove body and powered by the battery;

the memory configured to, upon receiving an indication of a third hand exercise event detected by a third sensor, store with data corresponding to the third hand exercise event an event time indicated by the clock;

at least one digit appendage comprising a digit aperture configured to expose a distal portion of the digit of the user;

at least a portion of at least one digit appendage external surface comprising a porous fabric;

the glove comprising a weight pouch attached to the glove body and configured to receive a weight, and comprising a sealable weight pouch aperture;

the glove comprising at least one reflector attached to the glove body external surface;

the glove comprising a glove pocket attached to the glove body external surface;

the glove comprising a stopwatch attached to the glove body external surface and comprising at least one of:
  a stopwatch output component; or
  a stopwatch control set;

the glove body comprising a cadence generating component comprising at least one of:
  a cadence control set configured to receive from the user an indication of a desired cadence;
  a cadence measuring component configured to measure a second desired cadence of the user; or
  a cadence output component configured to signal at least one of the desired cadence or the second desired cadence to the user; or a pull loop attached to a first digit appendage for a first digit of the user and a second digit appendage for a second digit of the user.

* * * * *